United States Patent [19]
Kreis

[11] 3,778,026
[45] Dec. 11, 1973

[54] HANDLE FOR FAST-ACTION VALVE

[76] Inventor: Philipp Kreis, Neumarkterstr. 34-36, Munich, Germany

[22] Filed: Dec. 3, 1971

[21] Appl. No.: 204,453

[30] Foreign Application Priority Data
Mar. 26, 1971 Germany............... P 21 14 847.0

[52] U.S. Cl................ 251/255, 251/367, 251/368, 16/110
[51] Int. Cl............................................. F16k 31/60
[58] Field of Search .......... 251/251–263, 266, 267, 251/268, 366, 367, 368; 16/110, 121, 122, 127; 24/263 SC; 74/89, 99

[56] References Cited
UNITED STATES PATENTS
1,291,183  1/1919  Schulder ............................ 251/268

| | | |
|---|---|---|
| 1,534,227 | 4/1925 | Livergood ...................... 24/263 SC |
| 3,614,059 | 10/1971 | Rothauser ......................... 251/368 |

FOREIGN PATENTS OR APPLICATIONS

| | | |
|---|---|---|
| 802,840 | 10/1958 | Great Britain ..................... 251/263 |
| 1,194,219 | 6/1965 | Germany .......................... 251/251 |

*Primary Examiner*—Martin P. Schwadron
*Assistant Examiner*—David R. Matthews
*Attorney*—Karl F. Ross

[57] ABSTRACT

A handle for a fast-action valve having a laterally projecting rotary operator comprises a pair of symmetrically identical members joined together along a plane and forming cavity opening in line with the plane. The two handle halves may be connected together by means of adhesive bonding, pins, snap rigs, keys fitted axially into the top of the handle, etc.

9 Claims, 5 Drawing Figures

HANDLE FOR FAST-ACTION VALVE

FIELD OF THE INVENTION

The present invention relates to a valve handle. More specifically this invention concerns a handle for a fast-action valve having a rotary operator.

BACKGROUND OF THE INVENTION

A type of valve is known wherein the valve body receives an axially displaceable valve stem that is has two laterally extending arms received in axially extending slots so that it cannot rotate. The arms engage respective ramps on a cavity formed in a handle such that rotation of the handle axially displaces the stem into and out of sealing engagement with the valve seat.

OBJECTS OF THE INVENTION

It is an object of the invention to provide an improved handle for such a valve.

Another object is the provision of a valve handle of the above-described general type which is simple and inexpensive to manufacture.

SUMMARY OF THE INVENTION

The above objects are attained according to the present invention by a handle having an axially open cavity receiving the operator. This handle is formed by a pair of symmetrically identical members joined together along a junction plane including the axis of the cavity. The junction plane corresponds to one plane of symmetry of the elongated handle which has another plane of symmetry perpendicular to the junction plane.

In accordance with another feature of this invention, the separation plane passes through that portion of the ramp or those portions of the ramps corresponding to the open position of the valve. Since the amount of back pressure exerted on the valve stem is at the lowest level in the valve-open position the tendency of such a handle to separate is minimized. In general the junction plane may intersect the camming ramp at the location at which the valve stem applies to the ramp the minimum stress.

According to yet another feature of the invention the means joining the two handle halves together comprises elements such as keys, pins, or rings which engage both halves; alternatively or in addition, adhesive bondings, e.g., by thermal or ultrasonic welding, solvent welding, application of an adhesive, may be used.

DESCRIPTION OF THE DRAWING

The above and other objects, features, and advantages will become apparent from the following, reference being made to the accompanying drawing in which.

SPECIFIC DESCRIPTION

Figure 1:
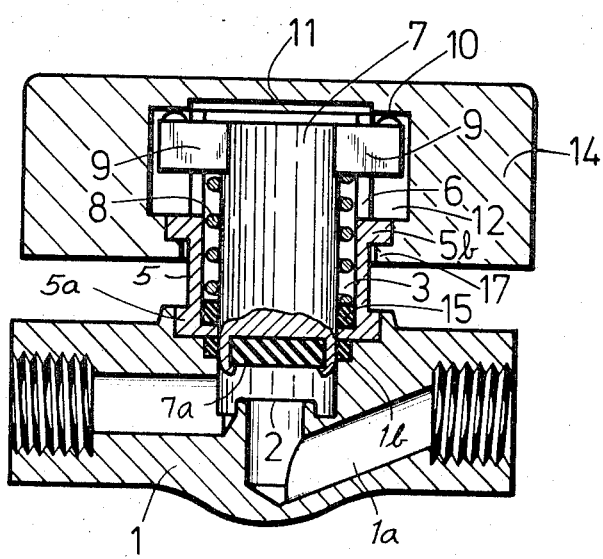
FIG. 1 is an axial vertical section through the valve according to the present invention, the section plane being located slightly inwardly of the handle junction plane.

As seen in FIG. 1 the valve has a body 1 in which is formed a passage 1a extending. In the middle of the passage 1a there is formed a laterally open annular valve seat 2 against which is engageable an elastomeric valve washer 7a carried on a valve stem 7.

A sleeve 5 which is coaxial with the seat 2 has a ledge 5a formed at its lower end which is received within a rim on the body 1. The sleeve 5 is formed at its other end with another outwardly projecting rim 5b which is received under a ledge 17 in a cavity 12 of a handle or actuating member 14 for the valve.

Coaxially received whithin the sleeve 5 and defining a cylindrically annular space 3 in which a compression spring 8 is received is the valve stem 7 which has a pair of diametrically opposite radially extending arms 9 received in longitudinal slots 6 formed in the sleeve 5. Thus, since the sleeve 5 is nonrotatable relative to the valve body 1, the valve body 7 is also nonrotatable. The outer ends of the arms 9 are formed with bosses that ride on a pair of arcuate ramps 10 formed in the cavity 12 of the actuating handle 14 of the valve. Since the cavity 12 is generally cylindrical and the ledge or rim 17 that engages under the ledge or rim 5b is circular this handle 14 can rotate about the sleeve 5.

The extreme upper end of the sleeve 5 is received in a circular recess 11 in the upper surface of the cavity 12 to prevent canting of the handle 14 relative to the sleeve 5. An O-ring 15 is compressed between the lower end of the spring 8 and the sleeve 5, and another seal 1b is provided between the lower end of the sleeve 5 and the body 1.

Figure 2:
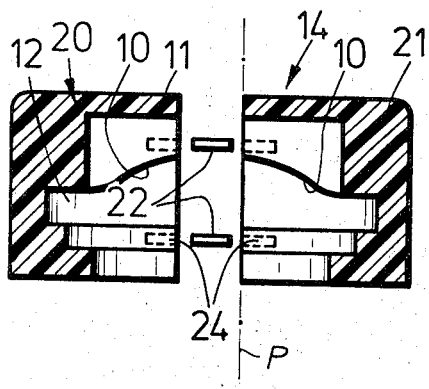
FIG. 2 is an exploded sectional view of the handle of the valve according to FIG. 1.

As seen in FIG. 2 the handle 14 is formed of a pair of symmetrically identical halves 20 and 21 interconnected by four pins 22 received in holes 24. The split or separation between the handle halves 20 and 21 is advantageously through that part of the handle 20 corresponding to the highest part of the ramp 10 for reasons explained hereinafter. Thus the separation plane lies along the longitudinal plane of symmetry which is perpendicular to the transverse plane of symmetry of the elongated handle.

Figure 3:
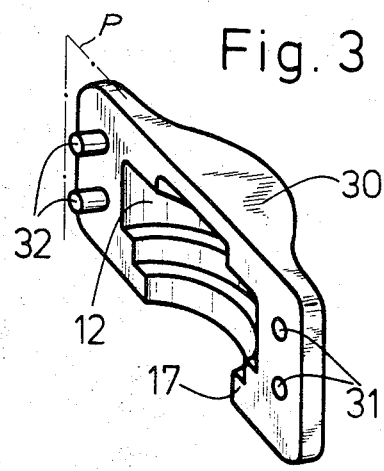
FIG. 3 is a perspective view of another embodiment of the handle.

FIG. 3 shows how a handle half 30 can be formed on one side with projecting pins 32 and the other side with cylindrical holes 31. Two such halves can be simply and easily connected together, advantageously with the addition of an adhesive between the two synthetic-resin halves.

Figure 4:
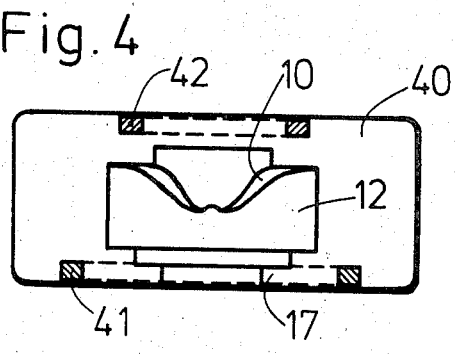
FIG. 4 is a sectional view of yet another embodiment of the present invention.

In FIG. 4 a pair of rings 41 and 42 are used to connect together two halves 40, one of which is shown. These rings are advantageously made of a slightly elastic synthetic resin and are fitted into the halves 40 with some prestress. A solvent can also be applied to the two faces of the elements 40 prior to fitting of the rings in order to bond them together.

Figure 5:
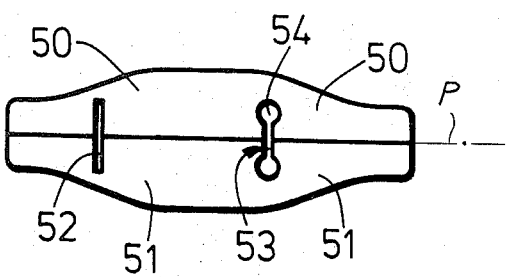
FIG. 5 is a top view of further embodiment of the handle according to the present invention.

FIG. 5 shows a pair of valve halves 50 and 51 joined on one side by a simple staple 52 and on the other side by means of a sort of key piece 53 having enlarged ends 54 fitted into a correspondingly spahed hole in the two elements, spanning the division plane P. These fasteners are advantageously metallic.

The valve described above is of the fast-open, fast-close type wherein rotation of the handle 14 through an angle of 90° in either direction suffices to bring it from the fully opened to the fully closed position. Thus when the two bosses on the arms 9 rest in the position shown in FIG. 1 at the extreme highest regions of the ramps 10, the valve is fully opened. Rotation of the valve handle 14 in either direction will cam the arms 9 and hence the valve stem 7 downwardly against the force of the spring 8 to bring the washer 7a carried on its lower end into sealing engagement with the seat 2 thereby fully closing the valve. The handle 14 is rotatable only; it does not move along its axis of rotation at all but merely rotates therearound.

The separation plane P of the handle 14 lies perpendicular to the arms 9 when they are in the down position compressing the spring 11 and parallel thereto in the relatively unstressed up position so that forces tending to spread the handle 14 apart are low to minimize chances of breaking the handle in half at the plane P.

I claim:

1. A handle for a valve having a laterally projecting rotary operator, said handle comprising a pair of members together forming an axially open cavity receiving said operator and constituting the only cavity-forming members, and means for joining said members together along a junction plane of the axis of said cavity, said members being substantially identical and mirror symmetrical, said cavity being formed with at least one ramp engageable with said operator to axially displace same, said ramp bearing upon said operator with relatively high pressure in one axial position of said operator and with relatively low pressure in another axial position thereof, said ramp extending continuously annularly around said axis along both members.

2. The handle defined in claim 1 wherein said plane extends through the region of engagement between said operator and said ramp in said other axial position of said operator.

3. The handle defined in claim 2 wherein said means includes at least one pin and a corresponding recess formed on each member for receiving the pin of the other.

4. The handle defined in claim 2 wherein said means for joining said members together includes at least one ring lying in a plane perpendicular to said junction plane and said axis while spanning said junction plane and engaging said members.

5. The handle defined in claim 2 wherein said means for joining said members together includes at least one fastener bridged across said plane with said members.

6. The handle defined in claim 2 wherein the handle is elongated and has a first plane of symmetry corresponding to said junction plane and a further plane of symmetry perpendicular to said junction plane and passing through said axis.

7. The handle defined in claim 6 wherein said means for joining said members comprises a plurality of fastener elements extending generally transversely to said junction plane and interconnecting said members.

8. The handle defined in claim 6 wherein said members are bonded together along said plane.

9. The handle defined in claim 6 wherein said members have inwardly extending ridges bounding said recesses and spaced from said ramps.

* * * * *